(12) United States Patent
Jhala

(10) Patent No.: US 12,500,879 B2
(45) Date of Patent: Dec. 16, 2025

(54) PROVISIONING OF ELECTRONIC TOKENS

(71) Applicant: PayPal, Inc., San Jose, CA (US)

(72) Inventor: Vishalsinh Ajitsinh Jhala, Morgan Hill, CA (US)

(73) Assignee: PayPal, Inc., San Jose, CA (US)

( * ) Notice: Subject to any disclaimer, the term of this patent is extended or adjusted under 35 U.S.C. 154(b) by 133 days.

(21) Appl. No.: 18/504,919

(22) Filed: Nov. 8, 2023

(65) Prior Publication Data

US 2025/0150442 A1    May 8, 2025

(51) Int. Cl.
*H04L 9/40* (2022.01)

(52) U.S. Cl.
CPC .................. *H04L 63/08* (2013.01)

(58) Field of Classification Search
CPC ... H04L 9/3213; H04L 63/08; H04L 63/0807; H04L 67/535
See application file for complete search history.

(56) References Cited

U.S. PATENT DOCUMENTS

| | | |
|---|---|---|
| 10,891,610 B2 | 1/2021 | Powell et al. |
| 2006/0272023 A1 | 11/2006 | Schmeidler et al. |
| 2014/0051522 A1 | 2/2014 | Robb |
| 2015/0032626 A1 | 1/2015 | Dill et al. |
| 2018/0268405 A1 * | 9/2018 | Lopez ................. G06Q 20/227 |
| 2018/0285875 A1 | 10/2018 | Law et al. |
| 2020/0005287 A1 | 1/2020 | Lopreiato et al. |
| 2020/0084202 A1 | 3/2020 | Smith et al. |
| 2021/0158315 A1 * | 5/2021 | Phillips .............. G06Q 20/3226 |
| 2022/0224686 A1 | 7/2022 | Soon-Shiong et al. |
| 2024/0202725 A1 * | 6/2024 | Anapliotis ......... G06Q 30/0607 |

OTHER PUBLICATIONS

International Search Report and Written Opinion in PCT Appl. No. PCT/US2024/053200 mailed Dec. 27, 2024, 9 pages.

* cited by examiner

*Primary Examiner* — Kevin Bechtel
(74) *Attorney, Agent, or Firm* — Kowert, Hood, Munyon, Rankin & Goetzel, P.C.; Scott W. Pape; Dean M. Munyon

(57) ABSTRACT

Disclosed methods and systems include monitoring, by a computer system, online activity associated with a plurality of entities and a plurality of user devices that have respective pluralities of tokens provided by the token management system. The computer system may detect particular online activity related to a first token of a first of the pluralities of tokens, associated with a first user device. The computer system may determine that the particular online activity affects a status of the first token. In response to the determining, the computer system may modify data within the first token using information within the particular online activity. In response to identifying a second token of the first plurality of tokens, the computer system may determine that the particular online activity also affects a status of the second token, and modify, without receiving input from the first user device, the second token using the information.

20 Claims, 8 Drawing Sheets

_400_

Monitoring, by a token management computer system, online activity associated with a plurality of entities and a plurality of user devices that have respective pluralities of tokens provided by the token management computer system.
_410_

Detecting, by the token management system, particular online activity related to a first token of a first of the pluralities of tokens, the first plurality of tokens associated with a first user device of the plurality of user devices.
_420_

Determining, by the token management computer system, that the particular online activity affects a status of the first token.
_430_

In response to the determining, modifying, by the token management computer system, data within the first token using information within the particular online activity.
_440_

In response to identifying a second token of the first plurality of tokens, determining, by the token management computer system, that the particular online activity also affects a status of the second token.
_450_

Modifying, by the token management computer system without receiving input from the first user device, the second token using information within the particular online activity.
_460_

*FIG. 4*

PROVISIONING OF ELECTRONIC TOKENS

BACKGROUND

Technical Field

This disclosure relates generally to online computer-enabled electronic exchanges, and more particularly to techniques for managing electronic tokens used in such exchanges.

Description of the Related Art

Electronic tokens may be used for a variety of online tasks, such as granting access to a particular user account on a web service, authorizing various types of electronic exchanges, authenticating a particular individual among a plurality of users, to represent a specific digital file, and the like. For example, an electronic token may be used by an online navigation service to maintain a list of various locations of interest to a particular user. Electronic tokens may be used by a media streaming service to authorize a particular user's rights to access a given media file. Online conferencing services may utilize electronic tokens to identify whether a particular user has rights to attend a given meeting.

Some forms of electronic tokens, such as one-time-use authentication tokens, may have short life spans. A one-time-use authentication token may be used as part of a multifactor authentication process, generated at a first point in time for use in authenticating a user and expiring in a matter of minutes or seconds if not used. Other forms of tokens, such as a network token, may have longer life spans, such as months or years. A network token may be used to facilitate an online payment between a specific user and a specific institution. Tokens with longer life spans may be modifiable, for example, to update the specific user's personal information. In some cases, the specific user may be associated with multiple network tokens for use with a variety of institutions.

BRIEF DESCRIPTION OF THE DRAWINGS

FIG. 4 illustrates a flow diagram of an embodiment of a method for detecting and updating data in a token.

DETAILED DESCRIPTION

Figure 1A:
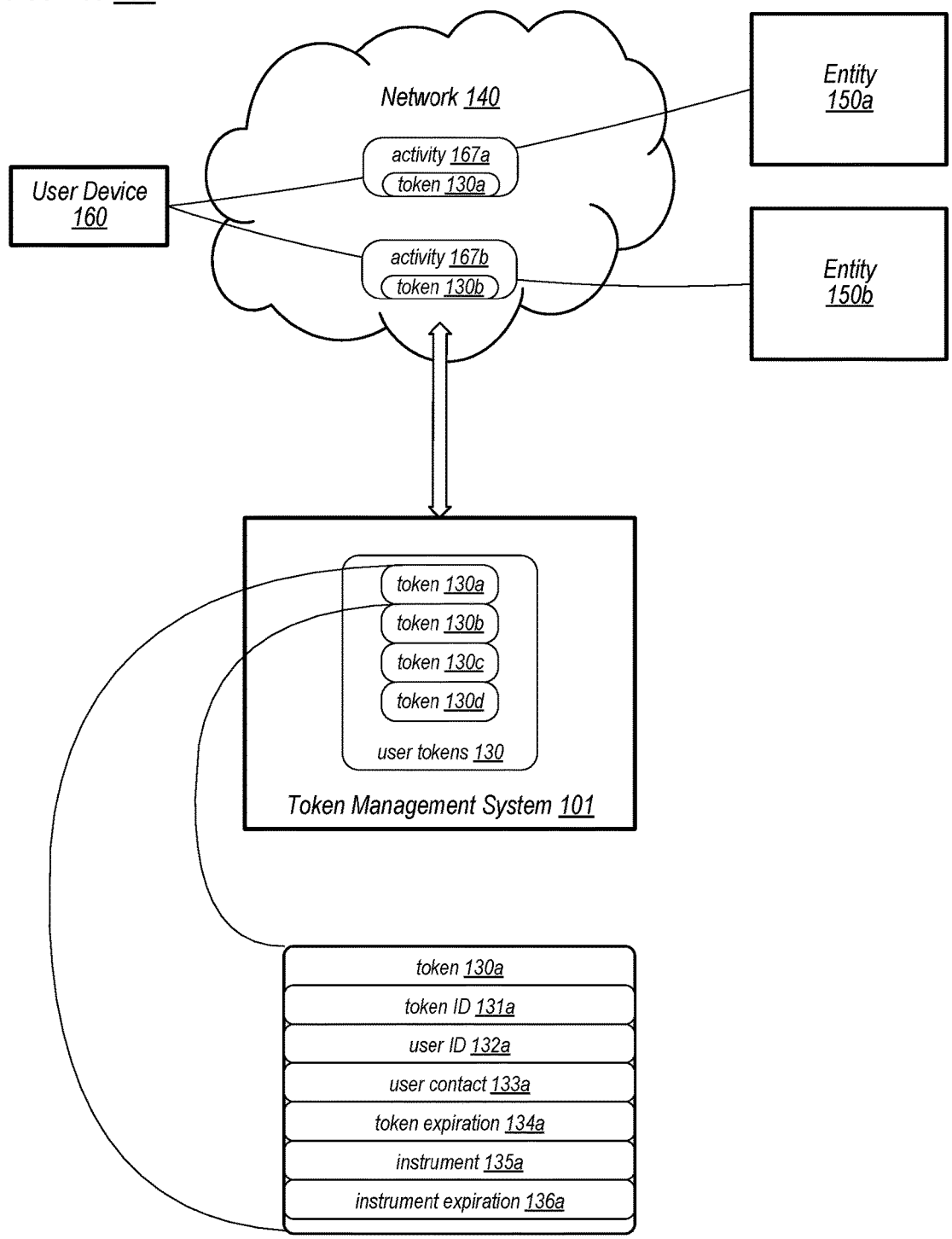
FIG. 1A is a block diagram illustrating an embodiment of an online service that utilizes tokens.

As disclosed above, certain types of electronic tokens may have life spans of months or years. Some of these electronic tokens may further include one or more values that can be modified over the life span of the tokens. For example, a digital rights token may identify a particular user that has rights to access a particular library of digital media. Such a digital rights token may include various pieces of information such as the user's name, contact information, an account number, an expiration date for the access rights, and so forth. Before the expiration date, the user's name or address may change, requiring a modification to the token's data. In some cases, the expiration date may change based on a renewal of the rights by the user. Furthermore, the particular user may have a plurality of digital rights tokens for accessing different digital media libraries. At least some of the information may be common across this plurality of digital rights tokens. Accordingly, a change that a user makes to a first token of their plurality of tokens may be applicable to one or more of the other tokens. The user may, therefore, have to initiate a plurality of requests to update each affected token in response to one change of information.

The present disclosure recognizes that a novel token management system may be capable of identifying a modification of a first token belonging to a given user and determining that one or more other tokens associated with the given user may be impacted by the same modification. By making such a determination, the given user may be spared the time and trouble of making individual requests to modify each impacted token. In addition, security and accuracy of the user's tokens may be increased by identifying and making the same modifications to all impacted tokens without having to wait for individual requests. The user, for example, may not submit a second request to update a different token until a point in time when the user needs the different token. Such a delay may be weeks, months or longer, leaving the other impacted tokens with out-of-date information.

Disclosed embodiments include a technique in which a token management system may monitor online activity between various entities and user devices that have one or more tokens provided by the token management system. The token management system may detect online activity related to a first token that is associated with a first user device. The token management system may determine that the online activity affects a status of the first token and, in response, modify data within the first token using information from the online activity. The token management system may identify a second token associated with the first user device, and determine that the online activity also affects a status of this second token. This second token may then be modified by the token management system without receiving a specific request from the first user device to perform the modification.

A block diagram of an embodiment of a system that may be used to implement the disclosed techniques is illustrated in FIG. 1A. As illustrated, online service 100 depicts an embodiment of token management system 101 monitoring activity in network 140. User device 160 may communicate, via network 140, with entity 150*a* and/or entity 150*b* (collectively entities 150). Token management system 101 maintains sets of tokens for a variety of users, including user tokens 130 that includes tokens 130*a*-130*d*.

As illustrated, a plurality of users may interact with ones of entities 150, which may provide any suitable form of product and/or service to the plurality of users. These interactions may include electronic exchanges between users and entities 150. For example, entity 150*a* may provide streaming services to stream particular media content to an authorized user, while entity 150*b* may provide goods or services for purchase. Other types of entities may include employers, government agencies, and educational institutions providing secure remote work environments to employees, researchers, students, and the like. As used herein, an "entity" refers to a computer system that is coupled to a network to allow authorized users to initiate electronic exchanges that are performed, at least in part, by the computer system. In addition, it is contemplated that a given computer system, including any computer system described herein, may implemented using a single computer system or a plurality of computer systems networked together, such as plurality of computers coupled together in a datacenter. In some embodiments, a computer system may refer to a virtual machine implemented in a datacenter using processing bandwidth from one or more physical computers.

A given on of the plurality of users may utilize user device 160 to connect to entities 150, via network 140. User devices 160 may be any suitable type of client computer device, including, e.g., a desktop/laptop computer, a tablet computer, a smart phone, and the like. Network 140 may include use of the Internet to enable communication between user device 160 and entities 150. In other embodiments, network 140 may be a closed network provided by one or more of entities 150 and/or a third party. In some embodiments, network 140 may be provided, at least in part, by online service 100.

As illustrated, online service 100 is a computer system configured to provide enablement for completing electronic exchanges between user device 160 and entities 150, including providing ones of tokens 130 as a means for authorizing a given electronic transaction. Online service 100 may be subscribed to by ones of the plurality of users and/or entities 150. For example, user device 160 may be used to log into a user account in online service 100 prior to completing a given electronic exchange. As used herein, an "electronic exchange" refers to an authorized transfer of information (e.g., payment authorization) between a user device and an entity. For example, an electronic exchange may include a user providing authenticated account information to a media server in exchange for receiving streamed media content, a user approving an electronic fund transfer in exchange for an agreement to provide goods and/or services to the user, a user providing proof of identity in exchange for access an online remote workspace, and so forth.

Use of online service 100 may include installation of an application on, or sending of an applet to, user device 160 and/or entities 150. Such an application may enable online service 100 to observe and determine when an electronic exchange is being performed between user device 160 and one of entities 150, thereby allowing online service 100 to provide an appropriate one of tokens 130 for authorization to complete the electronic exchange. In various embodiments, the authorization may include verification of a user identity of user device 160, validating authenticity of entities 150, determining a validity of an account of the user of user device 160, implementation of funding of a purchase, and the like.

As illustrated, a first token 130*a* is used for electronic exchanges between user device 160 and entity 150*a*, and a second token 130*b* is used for electronic exchanges between user device 160 and entity 150*b*. Accordingly, a given user may have a specific token 130 for each of entities 150. In some embodiments, the given user may have a plurality of tokens for a given one of entities 150. For example, as described above, entity 150*b* may provide goods or services for purchase. A user of user device 160 may have more than one payment instrument (e.g., a credit card, debit card, bank account, etc.) authorized for use with entity 150*b*. Each instrument may be linked to a different one of tokens 130.

An example of token 130*a* is shown in FIG. 1A to illustrate possible components of a token. Token 130*a* includes token identification (ID) 131*a*, user ID 132*a*, user contact 133*a*, token expiration 134*a*, instrument 135*a*, and instrument expiration 136*a*. Token ID 131*a* may be a unique value identifying token 130*a* from all other tokens 130 generated by online service 100. In some embodiments, some or all of token ID 131*a* may be an encrypted value, for example, including values from one or more other included components of token 130*a* and encrypted using any suitable encryption algorithm, such as Advanced Encryption Standard (AES) 256, Rivest-Shamir-Adleman (RSA), and the like. In other embodiments, token ID 131*a* may be a randomly (or pseudo-randomly) generated number.

User ID 132*a* is a value that identifies a particular user, such as the user's name, a chosen or assigned username, an account number, or any other suitable value that uniquely identifies the particular user. Unlike token ID 131*a*, user ID 132*a* may be reused for all tokens linked to the particular user. User contact 133*a* may be any suitable form of contact information for the particular user, such as an email address, mailing address, telephone number and the like. Token expiration 134*a* may be a value indicating when token 130*a* expires. Some tokens 130 may temporal, e.g., lasting, hours, weeks, years, etc. Token expiration 134*a* may represent a date or indicate an amount of time from a set point. If an attempt is made to use token 130 past a time indicated by token expiration 134*a*, an associated electronic exchange may be denied, requiring the user to use a different token 130 or to request a new or updated token 130 in order to complete the electronic exchange.

Instrument 135*a* may be a particular instrument linked to token 130*a* for completing electronic exchanges. For example, instrument 135*a* may be information for using a credit card, debit card, bank account, or the like for making online purchases. In other cases, instrument 135*a* may be account information or an access code for the particular user. For example, an employer may issue an access card to employees for accessing a physical building of the employer. The same access information may also be usable to remotely access an online workspace for the employee. In a similar manner as token expiration 134*a*, instrument expiration 136*a* may be a value indicating when instrument 135*a* expires. For example, if instrument 135*a* is a credit card, then instrument expiration 136*a* may be the expiration date of the credit card. Any form of instrument may have an associated expiration date. If a particular instrument does not have an expiration date, then a particular value may be used to indicate a lack of an expiration date.

It is noted that while token 130*a* is described as including components 131*a*-136*a*, the values representative of these components may not be included with token 130*a* when token 130*a* is used for electronic exchanges with entity 150*a*. In some embodiments, the values representative of components 131*a*-136*a* may be stored in a database within, or accessible by, online service 100. Use of token 130*a* may correspond to online service 100 providing, e.g., just token ID 131*a* to entity 150*a*. It is also noted that the illustrated components are merely an example. In other embodiments, user tokens 130 may include any suitable number of components, including components similar to a portion or all of components 131*a*-136*a*.

Online service 100 may maintain validity and security of user tokens 130 via token management system 101. Although only a single user device 160 and four user tokens 130 are shown in FIG. 1A, online service 100 may have hundreds, thousands, or even millions of users, each user with a respective one or more tokens that need to be managed. Token management system 101 may be used to track the use of user tokens 130 from initial generation to final deactivation.

Token management system 101, as shown, may be implemented as a single computer system or as a plurality of computer systems coupled together, such as in a server room or a datacenter. In some embodiments, token management system 101 may be implemented in a virtual machine. For example, token management system 101 may be implemented as a distributed computing system with one or more computer systems co-located in a plurality of different locations, including a plurality of global locations. Token management system 101 may be configured to monitor online activity associated with a plurality of tokens, including user tokens 130, that are provided by token management system 101. The monitoring may include observing online communications across network 140 that reference ones of user tokens 130. In some embodiments, the online communications between user device 160 and entities 150 may be facilitated via online service 100.

As described above, a given user may be linked to more than one token. For example, the user of user device 160 uses token 130a for performing electronic exchanges with entity 150a and uses token 130b for performing electronic exchanges with entity 150b. Some of the information linked to token 130a (e.g., user contact 133a) may be the same for token 130b (e.g., user contact 133b, not shown). A user may not go to online service 100 directly to update information that is relevant to tokens 130a and 130b. Instead, the user may perform an electronic exchange with entity 150a, and prior to completing the electronic exchange, may update their information used for user contact 133a. This may trigger a token update operation by token management system 101 to update the information for user contact 133a. This token update operation may occur prior to completing the associated electronic exchange or may occur at a later point in time. After this exchange, the user may attempt to perform an electronic exchange with entity 150b. In a similar manner, user contact 133b may need to be updated for token 130b. In some cases, the electronic exchange may be rejected if user contact 133b is not up-to-date.

As described, token management system 101 may be configured to monitor activity in network 140 that is associated with ones of tokens 130, including for example, activity 167a and 167b. Such activity may include logging into an online account, managing account preferences, utilizing cloud-based applications, performing electronic exchanges using tokens, updating user information, and the like. In the situation described in the previous paragraph, activity 167a may be the user sending updated contact information to entity 150a via user device 160. Token management system 101 may detect this activity and determine that user contact 133a should be updated in token 130a. In addition, token management system 101 may identify other user tokens 130 linked to the user, including token 130b. Token management system 101 may determine that user contact 133b of token 130b corresponds to user contact 133a, and therefore, user contact 133b should be updated in a similar manner. Token management system 101 may be capable of performing the update to user contact 133b prior to the user's subsequent use of token 130b to perform an electronic exchange with entity 150b. As a result, the subsequent electronic exchange with entity 150b may be performed without an interruption to update user contact 133b.

It is noted that the embodiment of FIG. 1A is merely an example. Features of the system have been simplified for clarity. In other embodiments, additional elements may be included, such as networking circuits to couple user device 160, entities 150, and token management system 101. In addition, a database may be included in, or coupled to, token management system 101, the database used to store, for example, the components associated with user tokens 130.

Figure 1B:
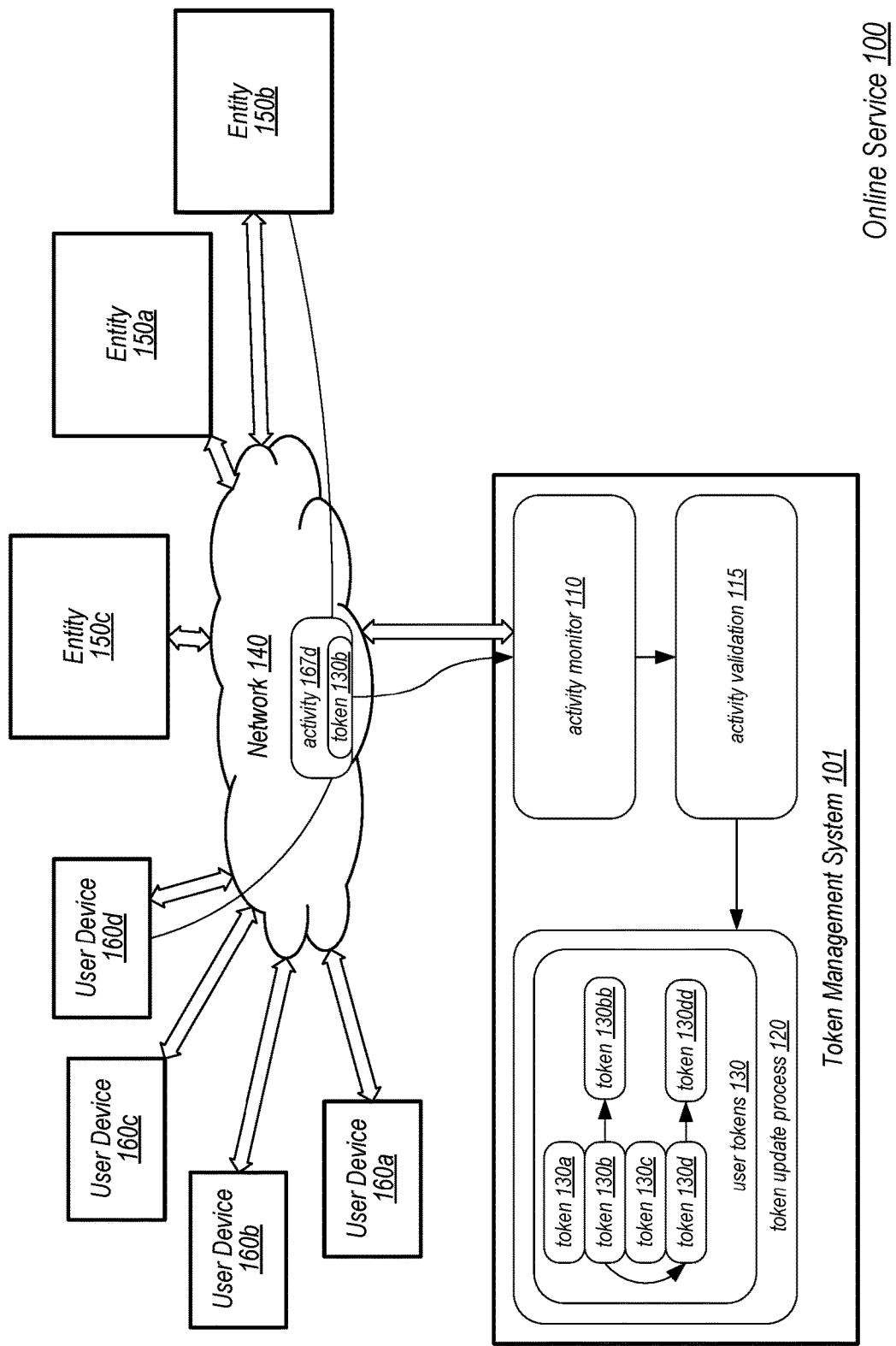
FIG. 1B is a block diagram illustrating another embodiment of the online service of FIG. 1A.

Proceeding to FIG. 1B, an example of online service 100 of FIG. 1A identifying activity related to tokens is illustrated. As illustrated, online service 100 depicts an embodiment of token management system 101 monitoring activity in network 140. User devices 160a-160d (collectively 160) may communicate, via network 140, with entities 150a-150c (collectively 150). Token management system 101 includes several modules, including activity monitor 110, activity validation 115, and token update process 120.

Token management system 101, as shown, may be configured to monitor online activity associated with a plurality of tokens, including user tokens 130, that are provided by token management system 101. This plurality of tokens may be usable to facilitate electronic exchanges within online service 100. The monitoring may include observing, e.g., using activity monitor 110, online communications across network 140 that reference ones of user tokens 130. In some embodiments, the online communications between user devices 160 and entities 150 may be facilitated via online service 100.

As illustrated, user device 160d participates in activity 167d with entity 150b. Activity 167d, for example, may include a request from entity 150b to user device 160d, the request being to update data included in, or associated with, token 130b. In other embodiments, activity 167d may be a request from user device 160d to entity 150b to update account information of a particular user of user device 160d, the particular user being associated with token 130b.

Token management system 101 may be configured to detect activity 167d and determine that activity 167d is associated with token 130b of user tokens 130. For example, token management system 101 may monitor online traffic through network 140, looking for references to ones of user tokens 130. Via this monitoring, token management system 101 may receive an indication that user device 160d communicated with entity 150b, the communication (corresponding to activity 167d) including a reference to token 130b.

Token management system 101 may, as shown, determine whether activity 167d includes any requests or other information that affects a status of token 130b. In the present example, token 130b may be usable to facilitate electronic exchanges between user device 160d and entity 150b. As such, token 130b may include information about the particular user of user device 160d, such as any of identity values, contact information, transaction history, risk assessments, account information, and the like. In some embodiments, token 130b may not directly include all associated information, but token management system 101 may instead keep such information in a corresponding database entry for the particular user. Any user tokens 130 that are associated with the particular user may then be linked to the corresponding database entry. Token 130b may include, or be linked to, a transaction instrument submitted to the particular user's account. Such a transaction instrument (e.g., a credit card, a media license agreement, a secure access card, and the like), may include one or more values that are updated after various lengths of time, such as an expiration date and/or personal identification number (PIN) for the instrument. Token management system 101 may determine whether activity 167d includes a request/command to alter information that would impact a status (e.g., validity) of token 130b.

Prior to performing any operations with token 130b, token management system 101 may also be configured to (e.g., using activity validation module 115) determine that the particular online activity is not fraudulent. For example, token management system 101 may be configured to determine whether token 130b is associated with the particular user, and then confirm that the particular user is associated with user device 160d. Token management system 101 may use active and/or passive techniques to determine whether the particular user is associated with user device 160d, such as requiring an authentication login to be performed by user device 160d, which may include multi-factor authentication operations. In some embodiments, token management system 101 may use locations techniques (e.g., use of global positioning information from user device 160d, network identification information from network 140, device identification information from user device 160d, and the like) to determine if a location of user device 160d corresponds to locations known to online service 100 as being associated with the particular user.

In response to determining that activity 167d affects a status of token 130b and verifying a legitimacy of activity 167d, token management system 101 may then (using token update process 120) update data within (or in an account linked to) token 130b using information within activity 167d. For example, activity 167d may include a request to update an expiration date of a transaction instrument linked to token 130b. In some embodiments, the expiration date may be encoded into token 130b, thereby resulting in token management system 101 modifying one or more values in token 130b to update the expiration date, resulting in token 130bb. In addition to, or in place of, updating token 130b, token management system 101 may update the expiration date in a database entry associated with an account of the particular user and linked to token 130b.

As shown, token management system 101 identifies a second token (e.g., token 130d) of user tokens 130 that is included in a same set of tokens as token 130b that is also associated with the particular user. For example, token 130b may be usable to facilitate electronic exchanges between the particular user and entity 150b. The particular user may also have token 130d that is usable to facilitate electronic exchanges between the particular user and entity 150c. To identify token 130d, token management system 101 may access a database that includes information on the set of tokens that are associated with the particular user. For example, tokens 130a-130d may be a set of tokens associated with the particular user.

After identifying the other ones of user tokens 130 that are associated with the particular user, token management system 101 may then determine which, if any of tokens 130a, 130c, and 130d are affected by activity 167d. For example, activity 167d may include an update to the transaction instrument as described. Token management system 101 may then determine that token 130d and token 130b are both linked to this same transaction instrument, while tokens 130a and 130c are not linked to this transaction instrument.

In response to determining that activity 167d affects a status of token 130d, token management system 101 may update data within (or in an account associated with) token 130d using the information within activity 167d. Updating token 130d may be performed without receiving additional input, e.g., from the particular user, from user device 160d, from entity 150b or from entity 150c. E.g., token management system 101 recognizes that activity 167d impacts more than just token 130b, and in response to determining that the information included in activity 167d also affects a status of token 130d, updates data associated with token 130d automatically, thereby generating token 130dd. In some embodiments, token management system 101 may send a notification to the particular user, e.g., via user device 160d, alerting the particular user of the update to token 130d. In such embodiments, the particular user may have an option to reject the update to token 130d, thereby causing any performed update to be rolled back to a previous state. In other embodiments, token management system 101 may send a request to the particular user to make the update to token 130d, and wait for a user approval before making the update.

By implementing token management techniques as described above, a token management system may be capable of updating a plurality of managed tokens based on a request to update a single token. Furthermore, by monitoring online traffic associated with the managed tokens, the token management system may be capable of detecting impending changes to one or more tokens prior to receiving an explicit request to make the requested update. Such techniques may increase an efficiency of the token management system, allowing tokens to be updated before an electronic transaction using the tokens is attempted. Accordingly, time for completing electronic transactions may be reduced, as well as reducing a number of false rejections of the tokens.

It is noted that the embodiment of FIG. 1 is merely an example. Features of the system have been simplified for clarity. In other embodiments, additional elements may be included, such as networking circuits to couple user devices 160, entities 150, and token management system 101. In addition, a database may be included in, or coupled to, token management system 101, the database used to store, for example, user account information that is associated with the managed user tokens.

Figure 2:
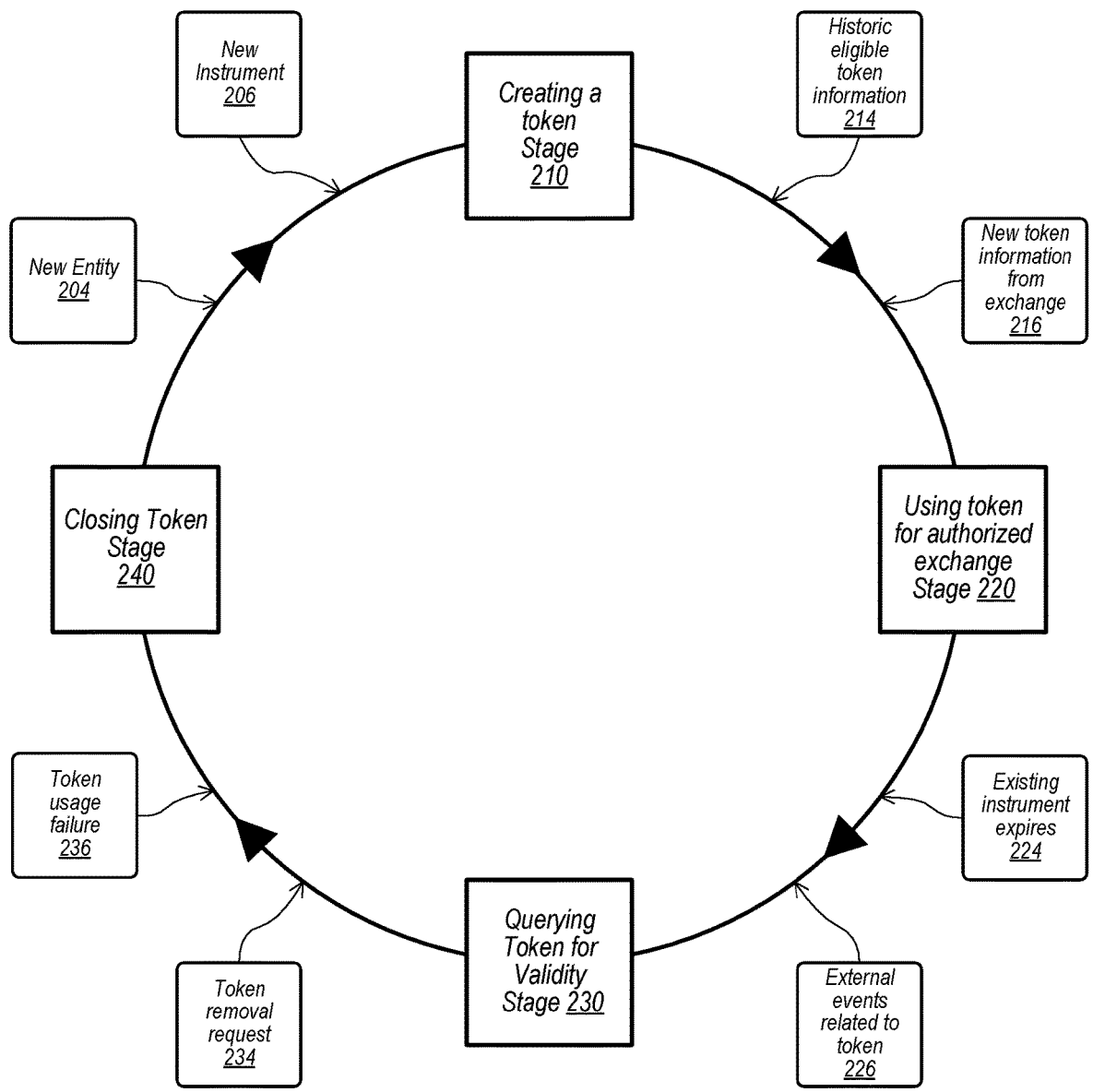
FIG. 2 shows a diagram of an embodiment of a lifecycle of tokens used in an online service.

As disclosed in FIG. 1, a technique is described for identifying activity associated with a first managed token, using information in the activity to update the first token, and then identify and update a second managed token that is associated with the first token. Various forms of activity may be associated with managed tokens, many of these forms may be detectable by a token management system and then evaluated to determine if any of the managed tokens are to be updated based on the detected activity. FIG. 2 illustrates various examples of token-associated activity.

Moving to FIG. 2, a diagram depicting an embodiment of a lifecycle of particular tokens is shown. Token lifecycle 200 depicts four stages (210-240), including creating a token stage 210, using a token for authorized exchange stage 220, querying token for validity stage 230, and closing token stage 240. A plurality of activities is shown when transitioning between lifecycle stages, which will be described below. An online service, such as online service 100 in FIG. 1, may utilize a computer system (e.g., token management system 101 of FIG. 1) to some or all stages of a given tokens lifecycle.

Although token lifecycle 200 is depicted as a circle without a beginning or end, a new token may begin at the creating a token stage 210. Various activities may result in creation of a new token, such as any of user tokens 130 in FIG. 1. For example, one or more new tokens may be created in response to new entity activity 204. New entity activity 204 may occur when a new entity subscribes to online service 100. This new entity may be a user creating a new account with online service 100, or may be a company or other institution that performs electronic exchanges with users who have respective tokens associated with the entity. For example, an existing user of online service 100 may wish to perform an electronic exchange with a particular entity that the user has not utilized previously. Activity between the existing user and the particular entity may be detected by token management system 101, and result in a new token being created in the creating a token stage 210. For example, as previously described, the user of user device 160d has an account on online service 100 that includes tokens 130b and 130d. This user may register an account on a new streaming service provided by entity 150d (not illustrated). As part of the registration, the user may provide a same credit card as used for token 130b and/or 130d. Despite the reuse of the credit card, a new token 130e (not illustrated) may be created for use with entity 150d, since there was no existing token for use by the user with entity 150d.

Creating a token stage 210 may also be performed in response to new instrument activity 206. For example, the existing user, after performing one or more electronic exchanges with the particular entity, may decide to add or replace a transaction instrument used for a first token used to perform those exchanges. As described above, a given token may be specific to a given user, a given transaction instrument, and a given company/institution. If the existing user would like to use a different transaction instrument with the particular entity, then adding the new transaction instrument may result in a second token being created in stage 210. Accordingly, the existing user may now have two tokens available for performing electronic exchanges with the particular entity. The existing user may, instead, decide to replace the first token with the second, thereby resulting in a token removal request 234 putting the first token in the closing token stage 240. At stage 240, the first token may no longer be accepted by the particular entity. For example, the user of user device 160d may have a particular credit card linked to token 130b for use with entity 150b. The user may wish to add a second instrument for use with entity 150b, such as a debit card. The user may communicate with entity 150b to add the debit card as an instrument for performing electronic exchanges (e.g., paying for a subscription fee). Token management system 101 may detect this communication and create a new token 130f, linked to the debit card and entity 150b.

After a particular token has been created in stage 210, the particular token may be used by the respective user to perform electronic exchanges with the corresponding entity. Use of the particular token results in activity that may be detected by token management system 101. For example, the respective user may use the particular token to log into a remote workspace. The remote workspace may request, and then receive login credentials from the respective user. The remote workspace, after validating the credentials, may request the particular token from online service 100 as part of a multifactor authentication, and/or to determine access permissions of the respective user. Token management system 101 may detect this request. This use of the particular token to access the remote workspace may not affect a status of the particular token. For example, if the particular token is valid and access is approved and executes without any issues, then there may not be any information in detected activity associated with the particular electronic exchange that impacts the particular token. If, however, the activity between the respective user and the remote workspace includes updating particular account information, such as a user ID or user contact information, then this activity may impact similar data linked to the particular token.

Accordingly, determining whether particular online activity affects a status of the particular token includes detecting, within the information within the particular online activity, a different value for a particular piece of information associated with the particular token. For example, activity such as new token information from an exchange 216 would affect the status of the particular token. Updating data may include updating an account identification number and/or an expiration value of the account identification number included in the particular token. Updating contact information of the user may also impact the particular token's status.

Other types of activity that may be detected by token management system 101 includes accesses to historic eligible token information 214. For example, as part of authorizing an electronic exchange, a particular entity may review history information associated with a given token and/or associated with the respective user of the given token, such as past electronic exchanges executed with the respective user. For instance, a given user may log into a streaming media service. Before granting access to the given user, the streaming media service may review some, or all, of the given user's usage history of the streaming media service, e.g., to determine whether there are indications of the given user's login credentials being improperly shared with unauthorized users. Such historic information may help to verify that the respective user is who they say they are and not an unauthorized user who has obtained the authorized user's credentials. Identifying a risk that a current user of the given token is not the actual authorized user may result in a risk assessment value associated with the given token to be modified, thereby affecting a status of the given token.

Usage of a particular token may result in other activity such as querying a token for validity in stage 230. For example, a particular entity may send a query to token management system 101 to determine whether the particular token is valid or has expired (224). In some embodiments, token expiration date (such as, token expiration 134a) may not be included with the particular token, and an entity attempting to use the particular token for an electronic exchange may request token management system 101 to provide such details. Returning to the remote workspace example, the user may be able to keep a remote session active for days. Rather than repeat a login operation each time the user accesses the remote workspace, the remote workspace may contact token management system 101 to validate that the token used to initiate the current session has not expired.

In addition, other external events may be related to a token (226) that are not directly related to usage of the particular token may impact a status of the token. For example, a data breach at an entity associated with the particular token may result in a temporary suspension of the token while an extent of the data breach is determined. As another example, information regarding a status of the user associated with the particular token may change, such as a marriage of the user that may impact a name associated with the particular token.

As shown, stage 240 includes closing a token. Tokens may be closed for a variety of reasons. As described above, a given user may request a token removal (234) for any reason, such as closing an account with the respective entity, changing to a different transaction instrument, concern that security of the token may have been compromised, and the like. In some cases, a first token may be deactivated in response to observed activity. For example, a marriage may result in a name change of the user, resulting in particular online activity between the user and a respective entity to update the user's name. A replacement token may be generated to replace an existing token linked to the maiden name, the replacement token including a married name extracted from within the particular online activity. The older token linked to the user's maiden name may then be deactivated.

It is noted, that in the various examples of online activity, the activity may occur between two or more entities outside of, but observable by, the online service 100. In other cases, an entity may direct a query or other activity to online service 100. In either case, token management system 101 may be capable of identifying the activity and determining whether the activity affects one or more tokens that are maintained by online service 100. By detecting the activity and updating affected tokens, the updated tokens may be kept in a ready-to-use state that allows for electronic exchanges to occur with a reduced rate of failures and/or delays, thereby reducing wasted bandwidth to service a failed exchange and increasing a success rate of exchanges for the involved entities.

It is noted that FIG. 2 is one example of a lifecycle for token management. Although four stages are presented for tokens, other embodiments may employ any other suitable number of stages. The illustrated activities are intended as nonlimiting examples for demonstrating the disclosed concepts. Various other forms of activity are contemplated. FIG. 2 illustrated various types of online activity that may be detected by a token management system. After detecting the online activity, a plurality of tasks may be performed to determine whether a one or more tokens are affected by the activity, and further tasks performed to update affected tokens. Examples of such tasks are described below in regards to FIG. 3.

Figure 3:
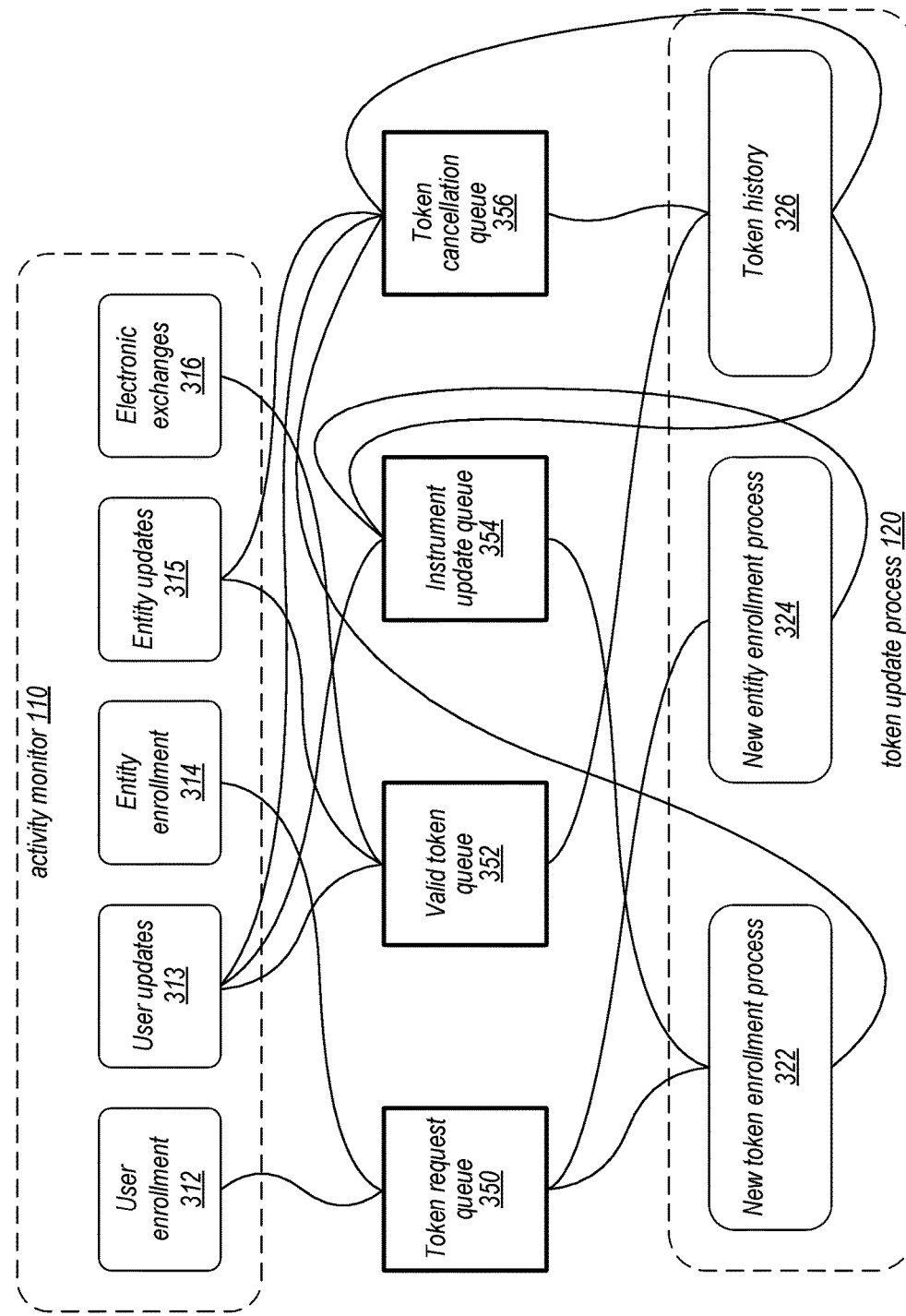
FIG. 3 depicts a block diagram of an embodiment of a token management system.

FIG. 3 depicts a block diagram of an embodiment of a token management system. Token management system 101 includes activity monitor 110 and token update process 120. Activity monitor 110 is shown with five modules, user enrollment 312, user updates 313, entity enrollment 314, entity updates 315, electronic exchanges 316. Token update process 120 is shown with three modules, new token enrollment process 322, new entity enrollment process 324, and token history 326. These modules may be implemented using hardware, software, or a combination thereof. A plurality of queues is maintained for buffering tasks to be completed by token update process, including token request queue 350, valid token queue 352, instrument update queue 354, and token cancellation queue 356.

As illustrated, activity monitor 110 monitors communications that involve tokens that are maintained by online service 100 of FIG. 1. In some embodiments, the monitored communications may be messages that are transmitted within an electronic exchange ecosystem within which the maintained tokens are used. In other embodiments, the monitored communications may be messages that are facilitated through online service 100. For example, online service 100 may enable electronic exchanges between any two or more subscribed users. Users may be individuals, businesses, or other institutions (e.g., educational, government, scientific/research, and so forth). Tokens maintained by online service 100 may be used to authenticate particular users involved in a given exchange, and/or to facilitate transfer of at least a portion of the exchange. For example, a given token may provide proof of a digital media rights license in exchange for access to a digital media library, or may provide a payment instrument to a merchant in exchange for goods and/or services. In some embodiments, online service 100 may facilitate messages between the entities involved in the electronic exchange, while in other embodiments, one or more entities in an exchange may send particular messages directly to online service 100.

To perform tasks related to monitoring communications, activity monitor 110, as shown, includes a plurality of modules that are associated with various types of activities related to tokens. These modules, user enrollment 312, user updates 313, entity enrollment 314, entity updates 315, and electronic exchanges 316, may monitor communication between users and entities. In some cases, these communications occur within an ecosystem provided by and/or supported by online service 100. For example, online service 100 may provide software that runs on user devices 160 and/or within computer systems of entities 150. Such software may provide notifications of token usage to the modules of activity monitor 110, thereby allowing these modules to identify activity related to particular tokens. Referring the FIG. 1B, for example, an applet running on user device 160d may detect that activity 167d a user's contact information is being updated with entity 150b. Aware that token 130b is associated with entity 150b, the applet may send a notification to token management system 101 regarding activity 167d.

In other cases, the communication between users and entities may result in a particular request being sent to token management system 101. For example, activity 167d in FIG. 1B may be an account login from user device 160d to entity 150b. Entity 150b may send a validation request to token management system 101 to verify that token 130b is still valid. The modules of activity monitor 110 may receive and process the various forms of token activity that are detected in network 140.

As illustrated, user enrollment 312 may perform actions associated with a new user attempting to sign up for services provided by online service 100, such as initiating one or more tasks for generating a new token. Users of online service 100 may include entities that request an electronic exchange with other entities who offer goods, services, intellectual property, and the like. In some embodiments, the request from the new user may be sent to a particular entity (e.g., entity 150a) with which the new user wishes to interact. Entity 150b may collect subscriber information directly and pass the information to online service 100, or may send a request to online service 100 to collect the subscriber information. In other embodiments, the new user may interact directly with online service 100 to establish a new subscriber account with entity 150b. This collection of subscriber information may be detected by user enrollment 312, thereby triggering one or more tasks within token management system 101. For example, enrollment of a new user may result in one or more tasks being created and queued in token request queue 350.

An existing user may submit a request to update their respective subscriber information, such as an address or other contact information, user name, transaction instruments, and the like. For example, the existing user may update a home address that is used by a streaming service to validate authorized access to streaming content, such as regional restricts on content. Some countries may restrict certain types of content. A new movie may be released on different dates in different countries. In a similar manner as for new user information, an update request may be submitted to a respective entity or to online service 100. Information used in such an update request may be detected by user updates 313, which in turn, may trigger one or more tasks to be placed into valid token queue 352, instrument update queue 354, and/or token cancellation queue 356.

In a similar manner as new users, new entities may subscribe to online service 100, thereby enabling online service 100 to provide services such as enabling secure electronic exchanges. For example, an entity providing an online remote workspace may subscribe to online services 100 to manage collection, storage, and maintenance of private data for users of remote online service 100, as management of such private data may be cumbersome due to various government regulations across different countries. A request to enroll in online services 100 may be detected by entity enrollment 314, and result in one or more tasks being queued to token request queue 350. Similar to user updates 313, entity updates 315 may detect requests from subscribed entities to update one or more pieces of subscriber information, thereby causing one or more tasks to be added to valid token queue 352 and/or token cancellation queue 356.

As described above, a request for an electronic exchange between two or more subscribed entities may trigger usage of a particular token managed by online service 100. Electronic exchanges 316 may detect the attempt to use the particular token, resulting in one or more tasks being submitted to valid token queue 352 to determine whether the particular token is currently valid for use with the requested electronic exchange.

As illustrated, token update process 120 includes three modules that may be executed to update a managed token. These modules retrieve tasks from the four illustrated queues and then process the retrieved tasks. In some cases, performing the retrieved tasks may result in a new task being generated and submitted to one of the four queues. Although four queues and three modules are illustrated, any suitable number of either may be included. Furthermore, although the modules and queues are described as single components, multiple instances of a same queue and/or module may exist concurrently to allow overlapping processing of various tasks. In some embodiments, a number of instances of queues and/or modules may be dynamic, e.g., a number of token request queues 350 and new token enrollment processes 322 may be increased during time periods of high demand for such services. As a number of new token requests subsides, a portion of instances of token request queues 350 and new token enrollment processes 322 may be decreased to release computing resources for use with other queues and processes.

As shown, new token enrollment process 322 may retrieve tasks from token request queue 350 and/or from instrument update queue 354. New token enrollment process 322 may generate a new token for a particular user and entity pair in response to a user enrollment or entity enrollment request. A new token may also be generated in response to a task from instrument update queue 354. For example, an update to an expiration date of a credit card may result in a replacement of a current token associated with this card and issuance of a new token linked to the updated expiration date. Accordingly, generation of a new token in response to an instrument update task may further result in generation of a new task for token cancellation queue 356, e.g., to replace the existing token associated with the old expiration date. New entity enrollment process 324 may generate an account for a given entity in response to a task from token request queue 350 associated with a request to enroll in online services 100. In some embodiments, a new task may be generated and placed in the instrument update queue 354. Token history 326 may retrieve tasks from valid token queue 352 to evaluate a given token's validity based on a history of usage of the given token. In addition, token history 326 may retrieve a task from token cancellation queue 356 in order to update a particular token's history, including, for example, information associated with a cancellation of the particular token.

A given task entry in any of the four queues may include an indicator for which modules in token update process 120 are to be used to process the given task. In other embodiments, separate entries may be created in a particular one of the queues, one for each module to be used in token update process 120. When token update process 120 has completed a given task, the corresponding task entry may be removed from the queue.

In some embodiments, determining that particular online activity affects a status of the particular token may include performing a risk assessment of one or more elements of the particular online activity to generate a risk indicator that is indicative of a likelihood that the particular online activity is unauthorized. For example, as part of user updates 313, activity monitor 110 may determine whether the online activity is a genuine request from an authorized user of the particular token. This determination may include submitting a task to valid token queue 352, which further triggers an evaluation of the history of the particular token, including, e.g., times and places when the authorized user has used and/or updated the particular token. Prior to updating data within the particular token, token management system 101 may make a determination that the particular online activity is not fraudulent.

Determining whether the particular online activity affects the status of the particular token may also include performing a token assessment of one or more elements of the particular online activity to determine whether the particular online activity affects a validity of the particular token. For example, user update 313 may determine whether data included in a request to update user information includes new data that affects the particular token, or if it is user information that is not directly associated with the particular token's status. In some embodiments this may result in a task placed in valid token queue 352 to compare data provided in the request to data included in the history of the particular token to determine whether any data associated with a status of the particular token has changed. For example, the data included in the request to update user information may be a user telephone number. In some cases, a user telephone number may not be relevant to the particular token, and no actions towards updating the particular token are necessary. In other embodiments, a mobile telephone number may be used as part of a multifactor authentication operation, in which case the telephone number may be relevant and further processing may be performed to update the particular token.

In some embodiments, queues 350-356 may have associated thresholds for determining whether a given one of the queues has too many or too few queued tasks at a given point in time. For example, one or more of queues 350-356 may have an upper limit threshold that is satisfied if the number of queued tasks in the respective queue equals or surpasses the upper limit. In response to a determination that one or more of queues 350-356 satisfy the upper limit threshold, token management system 101 may request, from online service 100, additional computer system bandwidth. Online service 100 may be comprised of a plurality of computer systems, e.g., in a server farm, and the request may be to reallocate a portion of the processing capability in the server farm to processing tasks from queues that have satisfied the threshold. The additional bandwidth may further include memory resources to increase a number of instances of one or more of queues 350-356, a number of instances of one or more of modules 312-316, and/or a number of instances of one or more of processes 322-326.

One or more of queues 350-356 may also have a lower limit threshold that is not satisfied if the number of queued tasks in the respective queue equals or falls below the lower limit. In response to a determination that one or more of queues 350-356 do not satisfy such a threshold number of tasks, token management system 101 may release, to online service 100, a portion of computer system bandwidth that is currently available to token management system 101. This release may include deallocation of memory used for extraneous instances of modules 312-316, queues 350-356, and/or processes 322-326.

It is noted that FIG. 3 depicts a variety of different actions that may result from detected activity related to tokens. As described above, activity resulting in an update to a first token may be used to identify an update to a second token related to a user associated with the first token. By automatically determining a relationship of a first token to a second token, a portion of the activity related to token updates may be omitted and the second token updated with similar information as used for updating the first token. This may reduce an amount of time used to update the second token, as well as reducing resources used to perform the update.

It is further noted that the example of FIG. 3 is merely for demonstrative purposes. A few elements for describing the disclosed concepts are illustrated. In other embodiments, a different number of modules may be included in activity monitor 110 and/or token update process 120, including for example, hundreds or thousands of modules. Although four queues are shown, any suitable number of queues may be included for buffering a variety of tasks associated with the disclosed techniques.

Figure 5:
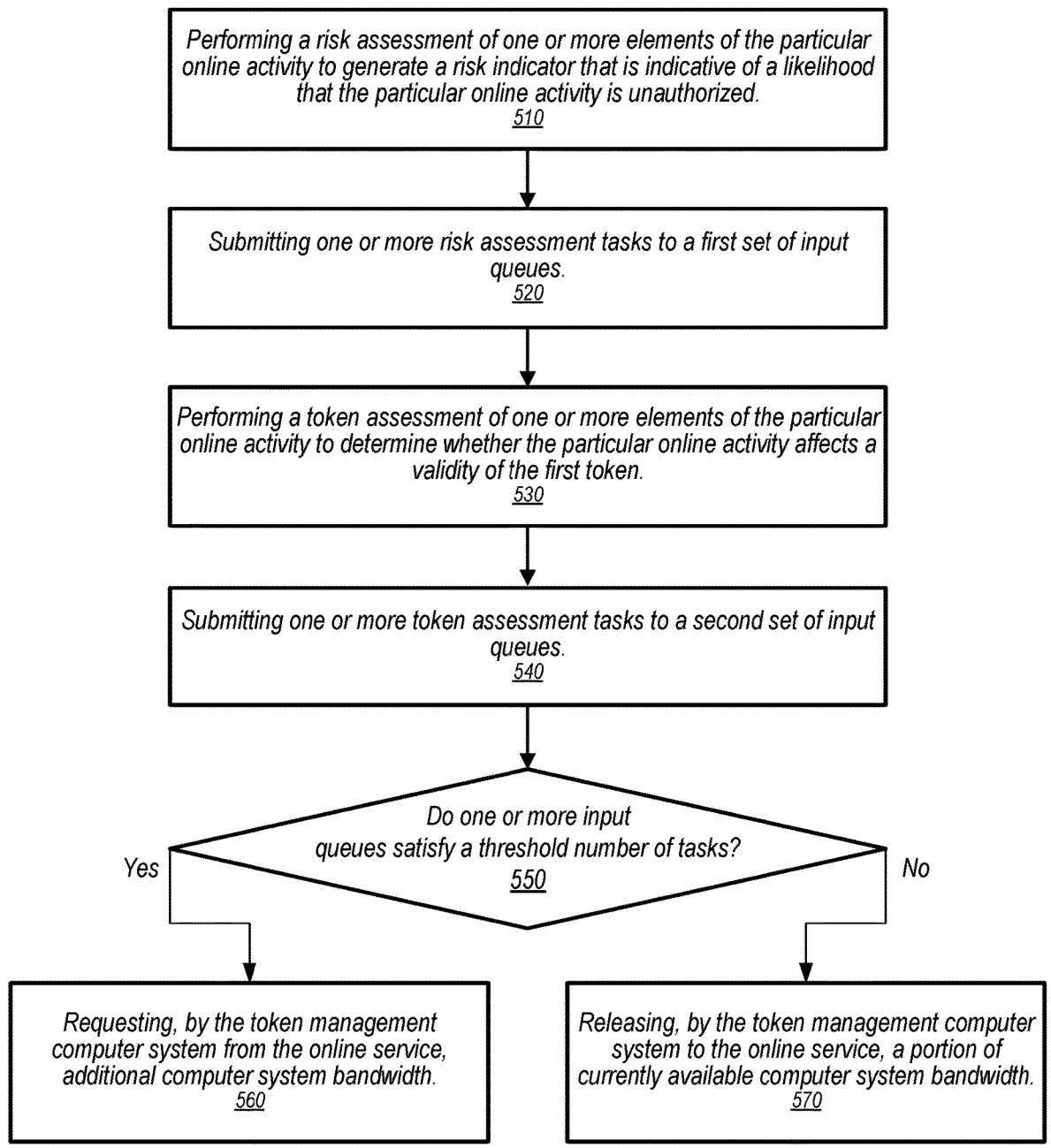
FIG. 5 shows a flow diagram of an embodiment of a method for adjusting computing bandwidth of a token management system.
Figure 6:
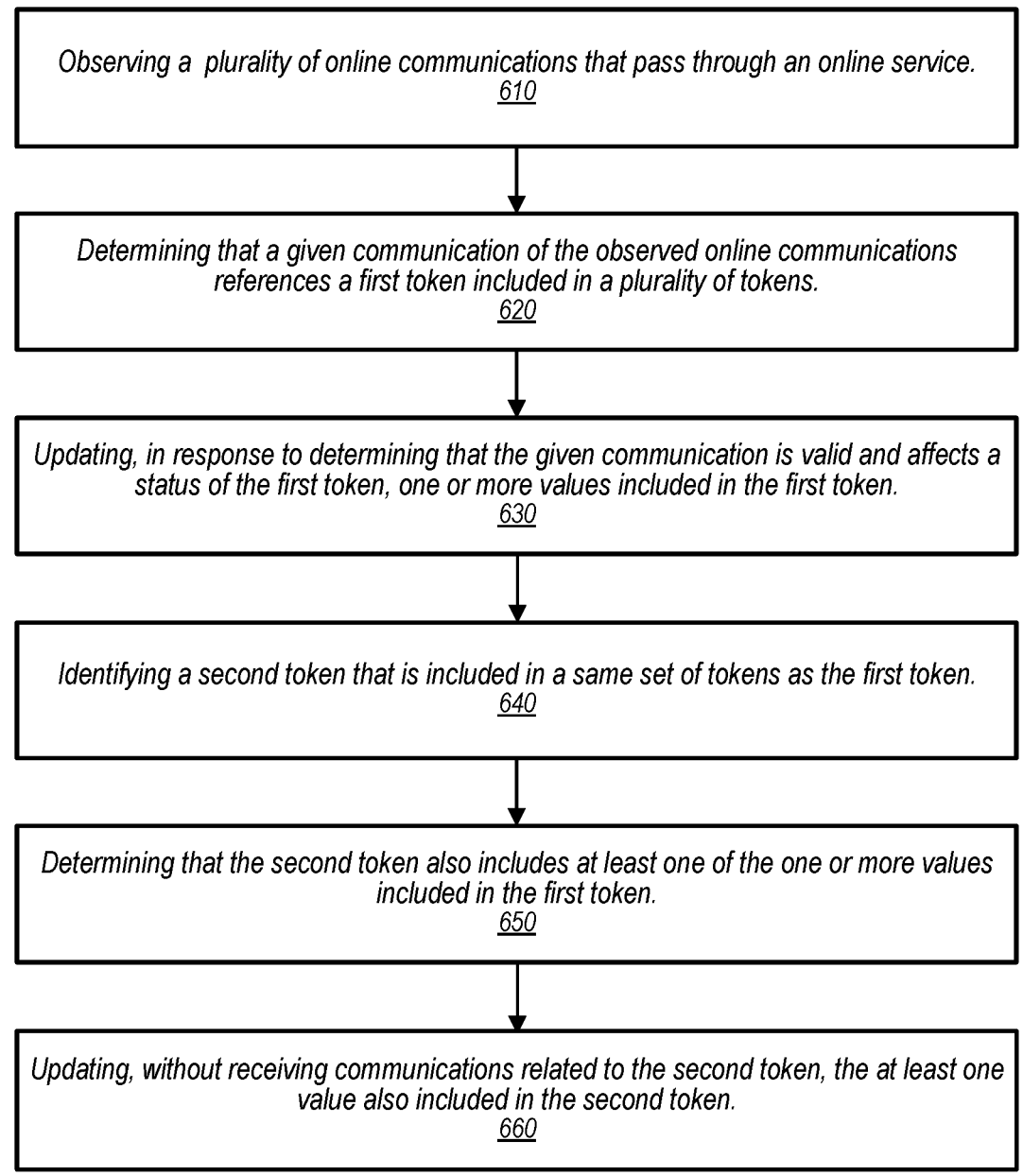
FIG. 6 depicts a flow diagram of an embodiment of a method for observing online communications for data impacting status of one or more tokens.

FIGS. 1A and 1B describe systems for managing tokens, including updating a plurality of tokens in response to detected activity related to a given token. FIG. 2 depicts an example of a lifecycle of tokens. FIG. 3 describes elements included in a token management system for identifying online activity that may affect an existing token. Techniques described in regards to these figures may be implemented using a variety of methods. FIGS. 4-6 describe three such methods.

Proceeding now to FIG. 4, a flow diagram of an embodiment of a method for identifying online activity and modifying an associated token is depicted. In various embodiments, method 400 may be performed by a computer system such as token management system 101 in FIGS. 1-3. Method 400 may, for example, be performed by token management system 101 to detect an update to a security code of a credit card used with a particular online marketplace. Using FIG. 1B as an example, token management system 101 may include (or have access to) a non-transitory, computer-readable medium having program instructions stored thereon that are executable by the processing system to cause the operations described with reference to FIG. 4. Method 400 is described below using token management system 101 of FIG. 1B as an example. References to elements in FIG. 1B are included as non-limiting examples.

At block 410, method 400 begins with a token management system monitoring online activity associated with a plurality of entities and a plurality of user devices that have respective pluralities of tokens provided by the token management system. For example, token management system 101 uses activity monitor 110 to observe network 140 for signs of activity related to ones of user tokens 130, such as activity 167*d* that is related to token 130*b*. User tokens 130 may be usable to facilitate electronic exchanges within online service 100. Network 140 may be, in whole or in part, included in online service 100, e.g., online service 100 may enable electronic exchanges between users and entities. In some embodiments, users may communicate directly with entities via portions of network 140 that are not included in online service 100. After an electronic exchange is initiated, the user and/or the entity may generate a message that passes through a portion of network 140 that is included in online service 100. Activity monitor 110 may observe all communication that passes through online service 100.

Method 400 continues at block 420 with the token management system detecting particular online activity related to a first token of a first of the pluralities of tokens, the first plurality of tokens associated with a first user device of the plurality of user devices. As shown in FIG. 1B, user device 160*d* engages in activity 167*d* with entity 150*b*. For example, activity monitor 110 may detect a request from entity 150*b* to user device 160*d*, such as a request for authentication, a request for updated user information, a request for a transaction instrument, and the like. Activity monitor 110 may determine that activity 167*d* is associated with token 130*b* based on any suitable means. The determination may be made based on a reference to token 130*b* within a message included in activity 167*d*. In other cases, activity 167*d* may reference or otherwise be linked to a particular user account associated with token 130*b*. As an example, token 130*b* may be a tokenization of a credit card of a user of user device 160*d*, token 130*b* used to make purchases from entity 150*b*. Activity 167*d* may be directed specifically to token 130*b*, e.g., an update to an expiration date of the credit card. In other cases, activity 167*d* may be related to a home address of the user, and therefore, activity 167*d* may not reference token 130*b*.

Method 400 further continues to block 430 with the token management system determining that the particular online activity affects a status of the first token. After determining that activity 167*d* is related to token 130*b*, a further determination is made as to whether activity 167*d* impacts a status of token 130*b*. For example, entity 150*b* may send a request to user device 160*d* to update or confirm contact information for the user of user device 160*d*. This request may trigger activity monitor 110 to tag activity 167*d* as related to token 130*b* that is associated with a user account linked to the user. A reply from user device 160*d* may further be included in activity 167*d*. If the reply from user device 160*d* confirms existing contact information with no changes, then token management system 101 may determine that the status of token 130*b* is not affected. If, on the other hand, user device 160*d* sends a reply including updated contact information, then token management system 101 may determine whether the updated contact information impacts the status of token 130*b*. The updated contact information may include, e.g., adding an additional email address, which may not impact token 130*b*. In other cases, the updated contact information may include a new home address for the user. A home address may be used to validate an authorized used of a credit card, resulting in the new home address requiring an update to token 130*b*.

At block 440, method 400 proceeds with the token management system modifying, in response to the determining, data within the first token using information within the particular online activity. After determining that activity 167*d* impacts the status of token 130*b*, token management system 101 may perform an update to token 130*b*, using data from activity 167*d*. Continuing with the updated contact information example, token 130*b* may be updated using the updated home address information provided by user device 160*d* as part of activity 167*d*. In various embodiments, token 130*b* may be modified directly and/or stored information linked to token 130*b* may be modified. In some embodiments, a modification to token 130*b* may include generating replacement token 130*bb* and invalidating token 130*b*.

At block 450, method 400 further proceeds with the token management system determining, in response to identifying a second token of the first plurality of tokens, that the particular online activity also affects a status of the second token. Token management system 101 may further determine that there are other tokens linked to a same user account as token 130*b*, such as token 130*d*. For example, tokens 130*b* and 130*d* may both be linked to a same user, but used with different ones of entities 150. While token 130*b* is linked to entity 150*b*, token 130*d* may be linked to entity 150*a*. Since both tokens 130*b* and 130*d* are linked to the same user, a change to this user's home address may impact token 130*d* as well as token 130*b*. For example, token 130*d* may also be linked to a credit card of the user, and therefore need to be updated with the new home address.

Method 400 continues at block 460 with the token management system modifying, without receiving input from the first user device, the second token using information within the particular online activity. After determining that activity 167*d* affects the status of token 130*d*, token management system 101 may update token 130*d* in a similar manner as token 130*b*. In some embodiments, token 130*d* may be invalidated and replaced with newly generated token 130*dd*. In other embodiments, token 130*d*, or stored information linked to token 130*d*, may be updated with the same updated home address data extracted from activity 167*d*. Token management system 101 may perform the update to token 130*d* without any additional input from user device 160*d* or entity 150*b*. In other embodiments, token management system 101 may request approval from user device 160*d* and/or entity 150*a* prior to making the update. In some embodiments, token management system 101 may perform the update first and then send a notification to user device 160*d* and/or entity 150*a* alerting of the updated token 130*dd*.

As previously disclosed, such proactive token management techniques may reduce an amount of time used to propagate updates to managed tokens. This reduction in time may result in fewer electronic exchanges being rejected due to outdated information. Proactive updates may reduce an amount of time and resources used by token management system 101. The proactive updates may also reduce frustration of users and entities associated with failed exchanges.

It is noted that the method of FIG. 4 includes blocks 410-460. Method 400 may end in block 460 or may repeat some or all of blocks 410-460. For example, blocks 450-460 may be repeated to identify and modify additional tokens impacted by the detected activity 167*d*. In some cases, method 400 may be performed concurrently with other instantiations of the method. For example, two or more processors in token management system 101 may each perform method 400 independently from one another, for example, monitoring activity associated with respective sets of entities.

Moving to FIG. 5, a flow diagram of an embodiment of a method for managing processing bandwidth by a token management system is depicted. In a similar manner as method 400, method 500 may be performed by a computer system such as token management system 101 in FIGS. 1A, 1B, and 3. The computer system may, for example, include (or have access to) a non-transitory, computer-readable medium having program instructions stored thereon that are executable by the computing device to cause at least some of the operations described with reference to FIG. 5. In some embodiments, portions or all of method 500 may correspond to one or more actions that occur as a part of block 430 in method 400. Method 500 is described below using token management system 101 in FIGS. 1B and 3 as examples. References to elements in FIGS. 1B and 3 are included as non-limiting examples. Operations of method 500 may begin after a token management system has detected particular online activity related to a first token of a plurality of tokens.

At block 510, method 500 begins with a token management system performing a risk assessment of one or more elements of the particular online activity to generate a risk indicator that is indicative of a likelihood that the particular online activity is unauthorized. For example, token management system 101 may determine whether detected activity 167*d* is associated with an authorized user associated with token 130*b*, or whether activity 167*d* is related to a hacking attempt to gain unauthorized use of token 130*b*. Token management system 101 may, e.g., using activity validation module 115, evaluate one or more metrics associated with activity 167*d*, such as previous use of user device 160*d* by the authorized user, a current location of user device 160*d*, historical trust values for entity 150*b*, and the like. Based on these metrics, a risk indicator may be generated.

Method 500 continues at block 520 with submitting one or more risk assessment tasks to a first set of input queues. To perform the evaluation of the metrics of activity 167*d*, token management system 101 may segment the evaluation into one or more tasks to be submitted to one or more processes in token management system 101. For example, one or more tasks may be submitted to valid token queue 352 in FIG. 3. Token history 326 may process the tasks to determine a history of usage of token 130*b*. Historical data such as dates and times of previous usage, user devices that were used to perform prior electronic exchanges or other token-related activities, identifications of networks used, and so forth, may be compared to current metrics to determine a value for the risk indicator.

At block 530, method 500 proceeds with performing a token assessment of one or more elements of the particular online activity to determine whether the particular online activity affects a validity of the first token. If the value of the risk indicator supports that activity 167*d* is related to authorized use of token 130*b*, then token management system 101 may determine whether activity 167*d* affects a validity of token 130*b*. As described above some activity may not influence the validity of token 130*b*, such as successful use of token 130*b* to complete an electronic exchange. Other activity such as updating or changing a home address linked to token 130*b* may require token 130*b* to be updated before it may be used to complete an electronic exchange.

At block 540, method 500 further continues with submitting one or more token assessment tasks to a second set of input queues. In a similar manner as in block 520, token management system 101 may segment the determination of block 530 into one or more tasks to be submitted to one or more processes in token management system 101. These tasks may be submitted to one or more of queues 350-356 for processing by token management system 101.

Further operation of method 500 may depend, at block 550, on a number of tasks buffered in one or more queues. Token management system 101 may detect and process activity related to many tokens over any given window of time. For example, token management system 101 may detect activity related to thousands or millions of tokens in a time window of minutes or seconds. The level of activity may also fluctuate over time. Accordingly, token management system 101 may employ one or more thresholds to assess whether a number of tasks queued within queues 350-356 is too high (e.g., satisfies a threshold) or too low (e.g., fails to satisfy a threshold) for a current amount of processing bandwidth allotted to token management system 101.

In response to satisfying the threshold number of tasks, method 500 proceeds to block 560 with the token management system requesting, from the online service, additional computer system bandwidth. If a particular number of queues 350-356 have a number of buffered tasks that satisfies the threshold, then token management system 101 may issue a request to a bandwidth allocation process within online service 100 to receive a large allotment of available bandwidth. Online service 100 may, for example, be implemented by a server farm including a plurality of server computers. In response to the request from token management system 101, the bandwidth allocation process may identify available bandwidth among the plurality of server computers and allot at least some of the identified bandwidth to token management system 101. As previously described, the additional bandwidth may include, for example, an increased allocation of memory and or processing resources to increase a number of instances of queues for buffering tasks and/or increase a number of instances of processes to execute the buffered tasks.

In response to not satisfying the threshold number of tasks, method 500 continues instead at block 570 with the token management system releasing, to the online service, a portion of currently available computer system bandwidth. In a similar manner as block 560, if a particular number of queues 350-356 fail to satisfy the threshold number of tasks, then token management system 101 may send a notification to the bandwidth allocation process that a portion of the bandwidth currently available to token management system 101 may be reallocated to other processes in online service 100. This may include release of one or more instances of queues and/or processes that are not needed for processing a current workload. In some embodiments, two or more thresholds may be used, e.g., an upper threshold for assessing if more bandwidth is needed and a lower threshold for assessing if bandwidth may be released. Additional thresholds may be used to determine, with greater resolution, an amount of bandwidth to be requested or released. It is also contemplated that different thresholds may be used for different queues.

It is noted that the method of FIG. 5 includes blocks 510-570. Method 500 may end in block 560 or 570. In some cases, some, or all, of the operations may be repeated to process other detected activity. In a similar manner as method 400, different instances of method 500 may be performed by one or more processors to process various subsets of detected activity. Method 500 may be performed concurrently with method 400 and/or as a portion of method 400, such as block 430.

Turning to FIG. 6, a flow diagram of an embodiment of a method for identifying online communication related to one or more of a plurality of tokens is illustrated. In various embodiments, method 600 may be performed by a computer system such as token management system 101 in FIGS. 1A, 1B, and 3. As described above, token management system 101 may include (or have access to) a non-transitory, computer-readable medium having program instructions stored thereon that are executable by the processing system to cause the operations described with reference to FIG. 6. Method 600 is described below using token management system 101 of FIG. 1B as an example. References to elements in FIG. 1B are included as non-limiting examples.

At block 610, method 600 begins with a token management system observing a plurality of online communications that pass through an online service. For example, online service 100 may facilitate interactions between user devices 160 and entities 150. Some of these interactions may be related to one or more of user tokens 130. Token management system 101 may observe these online communications looking for references to ones of user tokens 130 and/or references to user accounts related to ones of user tokens 130.

At block 620, method 600 continues with the token management system determining that a given communication of the observed online communications references a first token included in a plurality of tokens. For example, token management system 101 may detect a request from user device 160d to entity 150b. Token management system 101 may detect that the request includes a specific reference to token 130b. In other cases, token management system 101 may detect a specific reference to a particular user account to which token 130b is linked. For example, entity 150b may be a streaming service and the communication may include a request from user device 160d to entity 150b to access a particular media file, followed by a request from entity 150b to user device 160d to verify an address associated with an account into which user device 160d is currently logged. Token 130b may be linked to this account.

Method 600 further proceeds at block 630 with the token management system updating, in response to determining that the given communication is valid and affects a status of the first token, one or more values included in the first token. Prior to updating any data within token 130b, token management system 101 may determine that the given communication is not fraudulent. This may be accomplished, as previously described, by evaluating metrics associated with the given communication and determining whether elements of the given communication appear to be genuine or an attempt to fraudulently use token 130b. For example, an unauthorized person may be attempting to use the account to gain access to the streaming service. Metrics for determining whether an account access is valid may include comparing a current location of user device 160d to a location from a most recent previous account access. If the most recent account access occurred from Canada and user device 160d is currently in Australia, two hours after the previous access, then the current communication may be considered invalid. Otherwise, if the two locations are consistent, then the current communication may be considered valid.

After determining that the given communication appears to be genuine, token management system 101 may determine that the given communication affects a status of token 130b. For example, token management system 101 may detect, within the information within the given communication, a different value for a particular piece of information associated with token 130b. After determining that the given communication includes information that affects a status of token 130b, token management system 101 may update the data within token 130b, e.g., using information extracted from the communication. For example, if a time frame between the most recent access to the streaming account to the current access to the streaming account is two days, then the user of user device 160*a* may have genuinely traveled from Canada to Australia. Token 130*b* may be updated to indicate that the user is now in Australia and any streaming requests should be approved or rejected based on this new location.

At block 640, method 600 continues with the token management system identifying a second token that is included in a same set of tokens as the first token. For example, token management system 101 may identify a user account linked to token 130*b*. This user account may be linked to a plurality of user tokens 130, including, e.g., token 130*d*. A given user account may be linked to a plurality of user tokens 130, such as respective tokens for use with corresponding entities. For example, token 130*d* may be used by the user for accessing a different streaming service provided by entity 150*a*. Although the user may not have tried to access the streaming service of entity 150*a*, token management system 101 may flag token 130*d* to determine whether token 130*d* should also be updated.

Method 600 continues at block 650 with the token management system determining that the second token also includes at least one of the one or more values included in the first token. For example, token management system 101 may determine that token 130*d* includes the same location information as included in token 130*b*.

Additionally, method 600 proceeds to block 660 with the token management system updating, without receiving communications related to the second token, the at least one value also included in the second token. In response to determining that token 130*d* includes the same location information as token 130*b*, token management system 101 may update the location information using the same information used to update token 130*b*.

It is noted that the method of FIG. 6 includes blocks 610-660. In a similar manner as method 400, method 600 may end in block 660 or may repeat some or all of blocks 610-660. For example, blocks 640-660 may be repeated to identify and modify additional tokens impacted by the given communication. In some cases, method 600 may be performed concurrently with other instantiations of itself or the other methods disclosed above.

Figure 7:
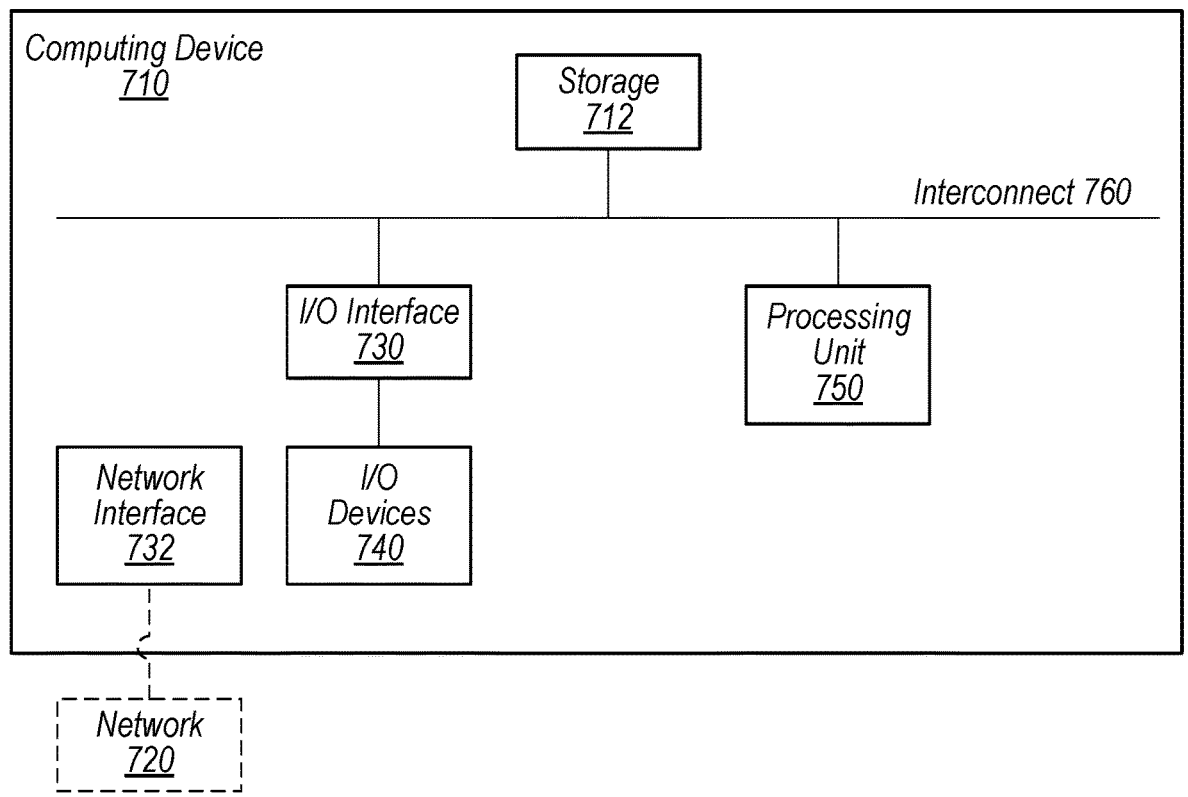
FIG. 7 is a block diagram illustrating an example computer system, according to some embodiments.

In the descriptions of FIGS. 1-6, various computer systems and online services have been disclosed. Such systems may be implemented in a variety of manners. FIG. 7 provides an example of a computer system that may correspond to one or more of the disclosed systems.

Example Computing Device

Turning now to FIG. 7, a block diagram of one embodiment of computing device (which may also be referred to as a computer system) 710 is depicted. Computing device 710 may be used to implement various portions of this disclosure. Computing device 710 may be any suitable type of device, including, but not limited to, a personal computer system, desktop computer, laptop or notebook computer, mainframe computer system, web server, workstation, or network computer. As shown, computing device 710 includes processing unit 750, storage 712, and input/output (I/O) interface 730 coupled via an interconnect 760 (e.g., a system bus). I/O interface 730 may be coupled to one or more I/O devices 740. Computing device 710 further includes network interface 732, which may be coupled to network 720 for communications with, for example, other computing devices.

In various embodiments, processing unit 750 includes one or more processors. In some embodiments, processing unit 750 includes one or more coprocessor units. In some embodiments, multiple instances of processing unit 750 may be coupled to interconnect 760. Processing unit 750 (or each processor within 750) may contain a cache or other form of on-board memory. In some embodiments, processing unit 750 may be implemented as a general-purpose processing unit, and in other embodiments it may be implemented as a special purpose processing unit (e.g., an ASIC). In general, computing device 710 is not limited to any particular type of processing unit or processor subsystem.

Storage subsystem 712 is usable by processing unit 750 (e.g., to store instructions executable by and data used by processing unit 750). Storage subsystem 712 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 712 may consist solely of volatile memory, in one embodiment. Storage subsystem 712 may store program instructions executable by computing device 710 using processing unit 750, including program instructions executable to cause computing device 710 to implement the various techniques disclosed herein.

I/O interface 730 may represent one or more interfaces and may be any of various types of interfaces configured to couple to and communicate with other devices, according to various embodiments. In one embodiment, I/O interface 730 is a bridge chip from a front-side to one or more back-side buses. I/O interface 730 may be coupled to one or more I/O devices 740 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C.

This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different elements (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

In this disclosure, various "modules" operable to perform designated functions are shown in the figures and described in detail (e.g., activity monitor 110, activity validation 115, and token update process 120, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A method comprising:
   monitoring, by a token management system, online activity associated with a plurality of entities and a plurality of user devices that have respective pluralities of tokens provided by the token management system, wherein the pluralities of tokens are usable to facilitate electronic exchanges within an online service;
   detecting, by the token management system, particular online activity related to a first token of a first of the pluralities of tokens, the first plurality of tokens associated with a first user device of the plurality of user devices;
   performing, by the token management system, a risk assessment of one or more elements of the particular online activity to generate a risk indicator that is indicative of a likelihood that the particular online activity is unauthorized;
   determining, by the token management system based on the risk indicator, that the particular online activity affects a status of the first token;
   in response to the determining, modifying, by the token management system, data within the first token using information within the particular online activity;
   in response to identifying a second token of the first plurality of tokens, determining, by the token management system, that the particular online activity also affects a status of the second token; and
   modifying, by the token management system without receiving input from the first user device, the second token using the information within the particular online activity.

2. The method of claim 1, wherein the monitoring includes observing online communications that include ones of the plurality of entities and ones the plurality of user devices, and wherein the online communications reference ones of tokens included in the respective pluralities of tokens.

3. The method of claim 1, wherein determining that the particular online activity affects the status of the first token includes performing a token assessment of one or more elements of the particular online activity to determine whether the particular online activity affects a validity of the first token.

4. The method of claim 3, wherein performing the risk assessment includes submitting one or more risk assessment tasks to a first set of input queues; and
   wherein performing the token assessment includes submitting one or more token assessment tasks to a second set of input queues.

5. The method of claim 4, further comprising:
   in response to a determination that one or more input queues of the first and second sets satisfy a threshold number of tasks, requesting, by the token management system from the online service, additional computer system bandwidth.

6. The method of claim 4, further comprising:
   in response to a determination that one or more input queues of the first and second sets do not satisfy a threshold number of tasks, releasing, by the token management system to the online service, a portion of currently available computer system bandwidth.

7. The method of claim 1, wherein detecting the particular online activity includes detecting, by the token management system, a request from a particular one of the plurality of entities to the first user device.

8. The method of claim 1, wherein modifying the data within the first token includes:
   deactivating the first token; and
   generating a third token to replace the first token, wherein the third token includes data based on the information within the particular online activity.

9. A non-transitory, computer-readable medium including instructions that when executed by a token management system, cause the token management system to perform operations including:
   monitoring online activity associated with a plurality of tokens provided by the token management system, wherein the plurality of tokens is usable to facilitate electronic exchanges within an online service;
   determining that a particular online activity is associated with a first token of the plurality of tokens;
   performing a risk assessment of one or more elements of the particular online activity to generate a risk indicator that is indicative of a likelihood that the particular online activity is unauthorized;
   in response to determining, based on the risk indicator, that the particular online activity affects a status of the first token, updating data within the first token using information within the particular online activity;
   identifying a second token of the plurality of tokens that is included in a same set of tokens as the first token; and
   in response to determining that the particular online activity affects a status of the second token, updating data within the second token using information within the particular online activity, wherein updating the second token is performed without receiving additional input.

10. The computer-readable medium of claim 9, wherein the monitoring includes observing online communications that reference ones of tokens included in the plurality of tokens, wherein the online communications pass through the online service.

11. The computer-readable medium of claim 9, wherein determining that the particular online activity affects a status of the first token includes detecting, within the information within the particular online activity, a different value for a particular piece of information associated with the first token.

12. The computer-readable medium of claim 9, further comprising, prior to updating the data within the first token, determining that the particular online activity is not fraudulent.

13. The computer-readable medium of claim 12, wherein determining that the particular online activity is not fraudulent includes:
submitting a plurality of tasks to a set of input queues; and
in response to a number of tasks in a given one of the set of input queues satisfying a particular threshold value, submitting a request for additional computing resources.

14. The computer-readable medium of claim 9, wherein updating the data within the first and second tokens includes updating an expiration value of an account identification number included in both the first and second tokens.

15. The computer-readable medium of claim 9, wherein detecting the particular online activity includes detecting a request from a first user device associated with the first token to a particular entity.

16. A system comprising:
a non-transitory memory storing instructions;
a processor configured to execute the instructions to cause the system to perform operations comprising:
monitoring online activity associated with a plurality of tokens provided by a token management system, wherein tokens of the plurality are usable to facilitate electronic exchanges within an online service;
determining that a particular online activity is associated with a first token of the plurality of tokens, wherein the particular online activity includes receiving, from a particular entity, a request to update data in the first token of the plurality of tokens, wherein the first token is associated with a particular user;
performing, by the token management system, a risk assessment of one or more elements of the particular online activity to generate a risk indicator that is indicative of a likelihood that the particular online activity is unauthorized;
based on the risk indicator, updating the data in the first token using information included with the request;
identifying a second token of the plurality of tokens that is also associated with the particular user; and
in response to determining that the information included with the request affects a status of the second token, updating data within the second token using the information included with the request, wherein updating the second token is performed without receiving a different request from the particular entity.

17. The system of claim 16, wherein the first token is usable to facilitate electronic exchanges between the particular user and the particular entity, and the second token is usable to facilitate electronic exchanges between the particular user and a different entity.

18. The system of claim 16, wherein the particular entity is the particular user and wherein the request to update the data in the first token is sent to a different entity that is also associated with the first token.

19. The system of claim 18, wherein the receiving of the requests includes:
monitoring online traffic for references to ones of the plurality of tokens; and
receiving an indication that the particular user communicated with the different entity, the communication including a reference to the first token.

20. The system of claim 16, wherein identifying the second token includes:
accessing a database that includes information on a set of tokens associated with the particular user; and
determining that the second token and the first token include respective secure values associated with a same identification value.

* * * * *